United States Patent
Kumar et al.

(10) Patent No.: US 12,439,868 B2
(45) Date of Patent: Oct. 14, 2025

(54) METHOD OF ENHANCING LIPID PRODUCTION IN ALGAE AND APPLICATIONS THEREOF

(71) Applicant: Reliance Industries Limited, Maharashtra (IN)

(72) Inventors: Gurumurthy Raja Krishna Kumar, Navimumbai (IN); Meenakshi Sundaram Chelliah, Jamnagar (IN); Meghna Rajvanshi, Mumbai (IN); G Venkata Subhash, Eleuru (IN); Dhairyarajsinh Rajendrasinh Gohil, Jamnagar (IN); Sridharan Govindachary, Montreal (CA); Santanu Dasgupta, Asansol (IN)

(73) Assignee: Reliance Industries Limited, Mumbai (IN)

( * ) Notice: Subject to any disclaimer, the term of this patent is extended or adjusted under 35 U.S.C. 154(b) by 989 days.

(21) Appl. No.: 17/186,834

(22) Filed: Feb. 26, 2021

(65) Prior Publication Data

US 2021/0267152 A1    Sep. 2, 2021

(30) Foreign Application Priority Data

Feb. 27, 2020  (IN) .............................. 202021008421

(51) Int. Cl.
| | |
|---|---|
| A01G 33/00 | (2006.01) |
| A01H 1/00 | (2006.01) |
| A01H 3/02 | (2006.01) |
| A01H 13/00 | (2006.01) |
| A01N 3/00 | (2006.01) |
| C12N 1/12 | (2006.01) |
| C12P 7/649 | (2022.01) |

(52) U.S. Cl.
CPC ............. *A01H 1/101* (2021.01); *A01G 33/00* (2013.01); *A01H 13/00* (2013.01); *A01N 3/00* (2013.01); *C12N 1/12* (2013.01); *C12P 7/649* (2013.01)

(58) Field of Classification Search
CPC .......... A01G 33/00; A01H 13/00; A01H 3/02; C12N 1/12; C12R 2001/89; C12P 7/649; Y02E 50/10; C12M 21/02
See application file for complete search history.

(56) References Cited

FOREIGN PATENT DOCUMENTS

| CN | 110923185 A | 3/2020 | |
|---|---|---|---|
| WO | WO-2019166959 A1 * | 9/2019 | ............... C12N 1/00 |

OTHER PUBLICATIONS

Grivalsky et al. Development of thin-layer cascades for microalgae cultivation: milestones (review). Folia Microbiologica. 2019;64:603-614.*
Aziz et al. Two-stage cultivation strategy for simultaneous increases in growth rate and lipid content of microalgae: A review. Renewable and Sustainable Energy Reviews. 2020; 119:1-15.*
Li et al. Algae for biofuels. Agriculture and Natural Resources. 2011;1-5.*
Dunford N. Algal biomass production. https://extension.okstate.edu/fact-sheets/algal-biomass-production.html. 2015;1-2.*
Challagulla et al., "Advances in techniques for assessment of microalgal lipids," Critical Reviews in Biotechnology, Jul. 2016, 37(5):566-578, 14 pages.
Liu et al., "Optimization of lipid production for algal biodiesel in nitrogen stressed cells of Dunaliella salina using FTIR analysis, " J. Chem. Technol. Biotechnol., Oct. 2013, 88(10):1807-1814, 9 pages.

* cited by examiner

*Primary Examiner* — Lynn Y Fan
(74) *Attorney, Agent, or Firm* — Fish & Richardson P.C.

(57) ABSTRACT

The present disclosure relates to the field of algal cultivation and biofuels. Particularly, the present disclosure relates to a method of enhancing lipid production during algal culturing. Particularly, the present disclosure relates to a method of enhancing neutral lipid and total lipid production by maintaining algae in a thin layer cultivation system and exposing said algae maintained in the thin layer cultivation system to infra-red (IR) radiation. Said method enhances lipid accumulation in algae, thereby increasing the yield of neutral lipids and total lipids. The method is simple, cost-effective in producing high quantities of algal-derived biofuels, requires shorter time duration for lipid induction and results in no or minimal reduction of biomass.

14 Claims, 8 Drawing Sheets

METHOD OF ENHANCING LIPID PRODUCTION IN ALGAE AND APPLICATIONS THEREOF

CROSS-REFERENCE TO RELATED APPLICATIONS

This application claims priority to Indian Patent Application number 202021008421 filed on Feb. 27, 2020. The disclosure of the prior application is considered part of the disclosure of this application, and is incorporated in its entirety into this application.

The present disclosure relates to the field of algal cultivation and biofuels. Particularly, the present disclosure relates to a method of enhancing lipid production during algal culturing. In an exemplary embodiment, the present disclosure relates to a method of enhancing neutral lipid and total lipid production by maintaining algae in a thin layer cultivation system and exposing said algae maintained in the thin layer cultivation system to infra-red (IR) radiation.

BACKGROUND

In the present scenario, harvesting energy from renewable sources is of great interest as renewable sources are intended for replacing the limited supply of fossil fuels. Among all, microalgae are a highly attractive potential source for biofuel production since they produce high energy compounds in the form of lipids directly or from storage components. For biofuel production from microalgae, high biomass productivity and high lipid content are mandatory requirements. While optimal growth conditions allow production of large amount of biomass, the biomass is often limited in its lipid content.

Algal species with high lipid content are typically slow growers. Therefore, there is a clear need for inducing lipid content post cultivation period through environmental stress. Triacylglycerides (TAG) are storage lipids, which accumulate under stress and help the cell to tolerate the adverse environmental conditions. Nutrient starvation (N and P) is the most common method of lipid enhancement. Under such condition, growth rate declines however, cells are able to synthesize lipids, provided that they have enough light and carbon dioxide ($CO_2$) availability to continue photosynthesis.

There have been extensive research efforts aimed at increasing and modifying the accumulation of neutral lipids in algae through physical, biochemical and genetic means. The biochemical approach entails controlling cultivation conditions (e.g., nutritional content, salinity, temperature, and pH). Triacylglycerides (TAG) are storage lipids, which accumulate under stress and help cells tolerate the adverse environmental conditions. Biosynthesis of TAG utilizes NADPH formed in photosynthesis and helps in regenerating $NADP^+$ (major electron acceptor in photosynthesis) and thus relieves cell stress. Nutrient starvation (N and P) is the most common method of lipid enhancement. Under such conditions, growth rate declines, however, the cells are able to synthesize lipids (TAG), provided that they have enough light and $CO_2$ availability to continue photosynthesis.

Other methods include increasing or decreasing temperature, salinity, pH during culturing thereby causing generation and accumulation of high-energy lipids, but again at the cost of reduced algal replication. Further, physical approaches such as irradiation of the algal culture has been used for lipid induction. However, such physical approaches suffer from limitations including lack of penetration and heat energy. The genetic approach further involves over expressing genes involved in lipid biosynthesis pathways. Thus, the aforesaid approaches are complicated and suffer from various drawbacks.

Therefore, there is a need to develop simple, cost-effective and more efficient processes for enhancing lipid production in algae without compromising on biomass production, to enable large scale production of lipids. The present disclosure addresses said need.

SUMMARY OF DISCLOSURE

Accordingly, the present invention relates to a method of enhancing lipid production in algae, said method comprising maintaining algae in a thin layer cultivation system at a culture depth of about 1 cm to 10 cm, and exposing said algae maintained in the thin layer cultivation system to infra-red (IR) radiation.

In an embodiment, in the above described method, the algae is cultured in a condition of nutrient repletion followed by nutrient depletion before subjecting the algae to thin layer cultivation and exposing to IR radiation.

In another embodiment, in the above described method, the algae is exposed to IR radiation after about 1 minute to 48 hours, preferably about 24 hours to about 48 hours of maintenance in the thin layer cultivation system.

In a further embodiment, in the above described method, the algae is exposed to IR radiation of a wavelength ranging from about 700 nm to 1200 nm, preferably about 1000 nm to 1100 nm.

In a still further embodiment, in the above described method, wherein the algae is exposed to the IR radiation for a time-period ranging from about 1 second to 60 minutes.

In order to facilitate the above method, the present disclosure further provides a system for enhancing lipid production in algae, said system comprising:
  a cultivation apparatus,
  algae maintained in the cultivation apparatus at a culture depth ranging from about 1 cm to 10 cm, and
  a source of IR radiation integrated with the cultivation apparatus,
  wherein the lipid production is enhanced in the system by maintaining the algae in the cultivation apparatus and exposing said algae to the IR radiation.

Further, the present disclosure provides use of the above described method or system for enhanced production of lipid in algae.

BRIEF DESCRIPTION OF THE ACCOMPANYING FIGURES

In order that the disclosure may be readily understood and put into practical effect, reference will now be made to exemplary embodiments as illustrated with reference to the accompanying figures. The figures together with detailed description below, are incorporated in and form part of the specification, and serve to further illustrate the embodiments and explain various principles and advantages, where:

DESCRIPTION OF THE DISCLOSURE

Figure 1:
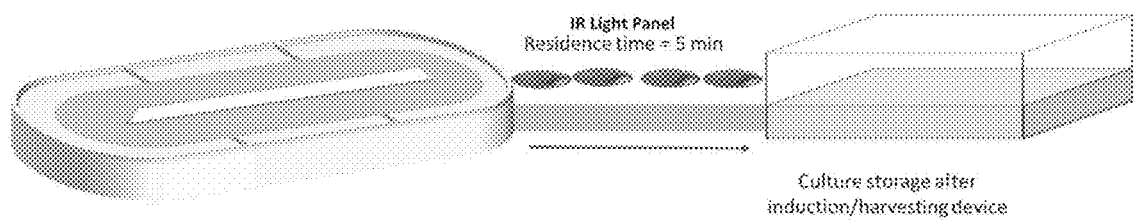
FIG. 1 depicts the flat panel variant of the thin layer cultivation system described in the present disclosure.
Figure 2:
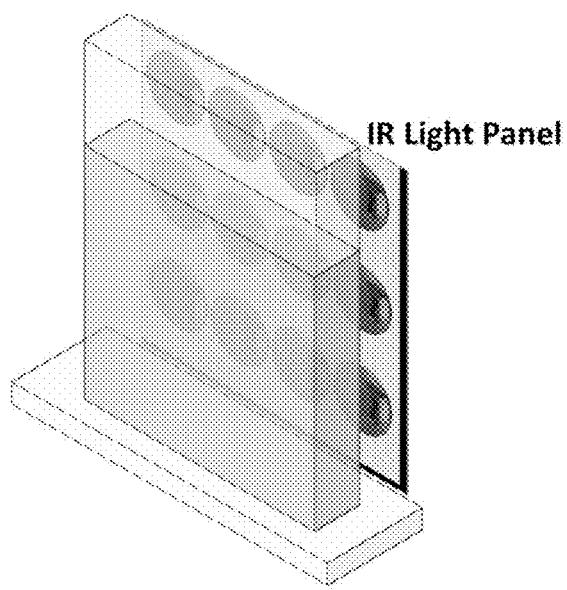
FIG. 2 depicts the vertical reactor variant of the thin layer cultivation system described in the present disclosure.
Figure 3:
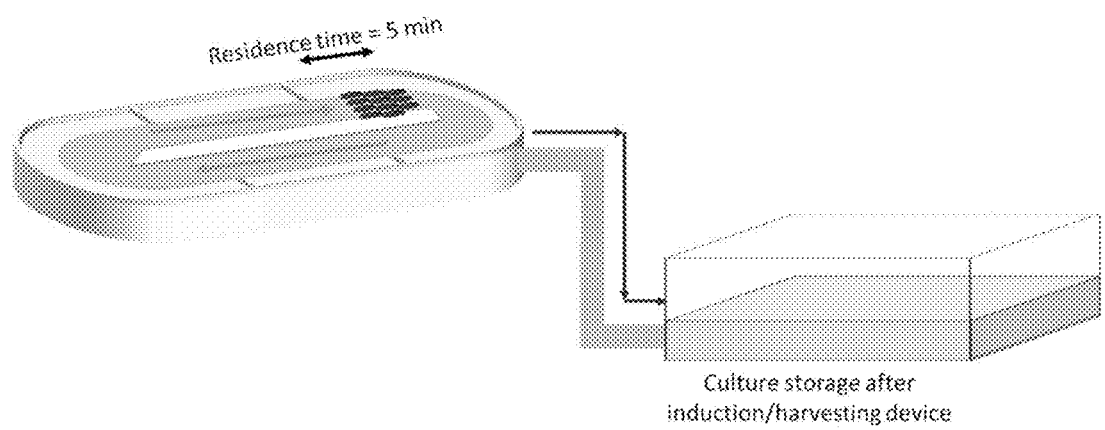
FIG. 3 depicts the horizontal reactor variant of the thin layer cultivation system described in the present disclosure.
Figure 4:
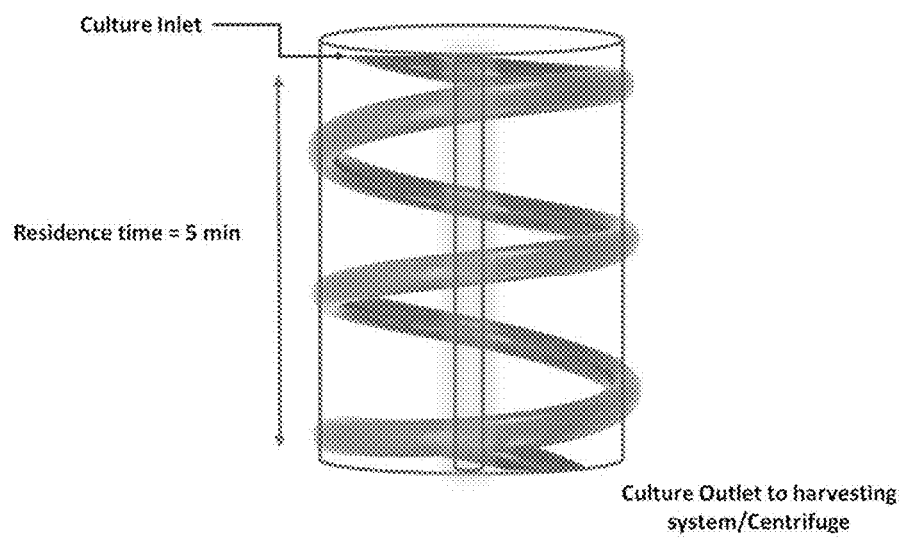
FIG. 4 depicts the tubular reactor variant of the thin layer cultivation system described in the present disclosure.
Figure 5:
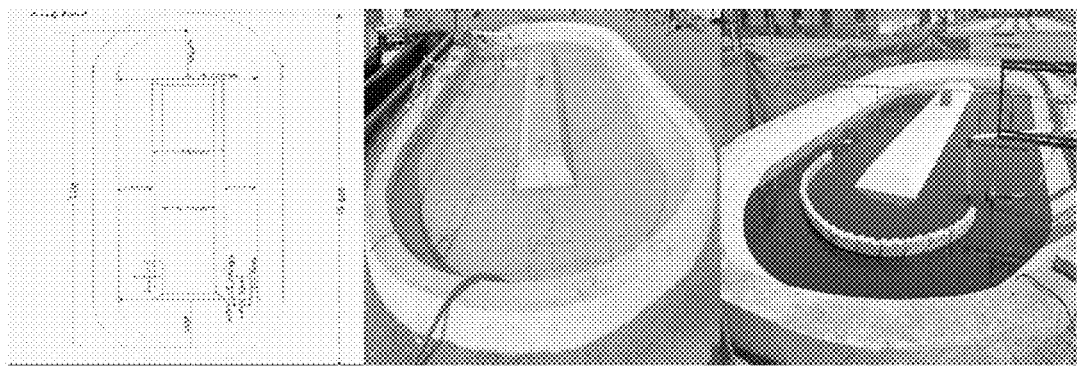
FIG. 5 depicts the culture pond variant of the thin layer cultivation system described in the present disclosure.
Figure 6:
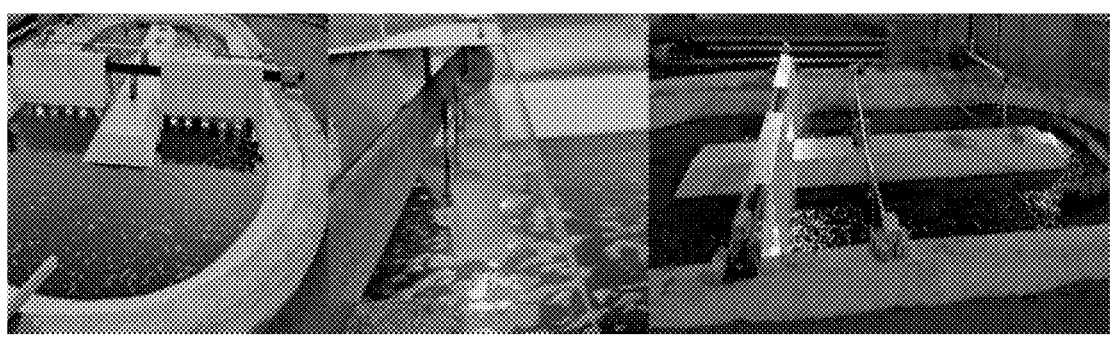
FIG. 6 depicts the application of IR radiation in the culture pond variant of the thin layer cultivation system described in the present disclosure.
Figure 7:
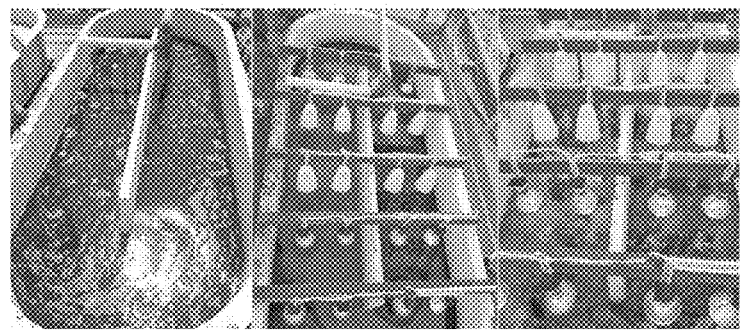
FIG. 7 depicts real time experimentation in the culture pond variant of the thin layer cultivation system described in the present disclosure

To address the limitations as stated in the background, the present disclosure provides a simple and efficient method for enhancing lipid production in algae.

However, before describing the method in greater detail, it is important to take note of the common terms and phrases that are employed throughout the present disclosure for better understanding of the technology provided herein.

Unless otherwise defined herein, scientific and technical terms used in connection with the present disclosure shall have the meanings that are commonly understood by those of ordinary skill in the art. Further, unless otherwise required by context, singular terms shall include the plural and plural terms shall include the singular. As used throughout the present disclosure, ranges are a shorthand for describing each and every value within the range. Any value within the range can be selected as the terminus of the range. The term "about" used in conjunction with values of different parameters defined throughout the specification provides a margin of +10%. The term "and/or" as used in a phrase such as "A and/or B" herein is intended to include "A and B", "A or B", "A", and "B".

Generally, nomenclatures used in connection with, and techniques of biochemistry, enzymology, molecular and cellular biology, microbiology, genetics and protein/nucleic acid chemistry and hybridization described herein are those well-known and commonly used in the art. To facilitate an understanding of the present disclosure, a number of terms and phrases are defined below.

The terms "algae", "algal cell", "algal strain" used interchangeably refer to eukaryotic aquatic organisms belonging to the kingdom Protista, that have the ability to conduct photosynthesis.

The term "maintaining" used in the context of 'maintaining algal culture in thin layer cultivation system' refers to maintaining the culture in the system such that there is no active multiplication or growth of the algae in said culture. The algal cells, post cultivation and harvesting, are transferred to the thin layer cultivation system, wherein they are maintained in the system specifically to subject the cells to specific conditions in the system.

The term "biomass" as used herein, refers in general to organic matter produced by a biological cell. The renewable biological resource can include microbial materials (including algal materials) or materials produced biologically. In certain embodiments, the biomass is algal biomass. The algal biomass can be dry, substantially dry, or wet. "Biomass" should be understood to include proteins, lipids, and polysaccharides, whether retained within a biological cell or excreted from a biological cell, in addition to other molecules synthesized by a biological cell.

As used herein, "neutral lipids" refer to hydrophobic molecules (lipid moieties) lacking charged groups. Triacylglycerols (TAGs), steryl esters (SEs) and wax esters (WEs) majorly form the group of neutral lipids.

As used herein, "total lipids" consists of neutral lipids and polar lipids.

As used herein, the reference to "maintaining" algae in thin layer cultivation system implies maintenance of the algal culture in thin layer cultivation system without necessitating multiplication of cells or increase in biomass.

Accordingly, to reiterate, the present disclosure relates to a method of increasing lipid content in algae.

In an embodiment, said method of the present disclosure comprises maintaining algae in a thin layer cultivation system, and exposing said algae maintained in the thin layer cultivation system to infra-red (IR) radiation.

In an exemplary embodiment, said method of the present disclosure comprises maintaining algae in a thin layer cultivation system at a culture depth of about 1 cm to 10 cm, and exposing said algae maintained in the thin layer cultivation system to infra-red (IR) radiation.

In an embodiment, the algae maintained in the thin layer cultivation system is concentrated algal culture having a cell density ranging from about 5 g/L to 100 g/L.

In an embodiment, the method comprises maintaining the concentrated algal culture in the thin layer cultivation system at a culture depth of about 1 cm to 10 cm, and exposing said algae maintained in the thin layer cultivation system to infra-red (IR) radiation to enhance lipid production in the algal culture.

In an embodiment, the algae subjected to the above described method is algae cultured under nutrient replete conditions followed by nutrient deplete conditions. Said culturing of the algae in nutrient replete followed by nutrient deplete conditions is performed before subjecting the algae to thin layer cultivation and exposing to IR radiation.

In an embodiment, the condition of nutrient depletion comprises depletion of nutrient selected from a group comprising Nitrogen, Phosphorus and a combination thereof.

In another embodiment of the present disclosure, once subjected to nutrient deplete conditions, no additional macronutrients or micronutrients are added to the algae in culture at any point of time.

In an exemplary embodiment, the algae maintained in the thin layer cultivation system at a culture depth of about 1 cm to 10 cm and exposed to infra-red (IR) radiation in the thin layer cultivation system, prior to said maintenance in the thin layer cultivation system is cultured under nutrient replete conditions followed by nutrient deplete. Said nutrient deplete conditions are preferably conditions of Nitrogen and Phosphorus depletion.

The algae subjected to the method of present disclosure is any algae capable of producing lipids. In embodiments of the present disclosure, the algae is microalgae selected from a group comprising green algae, diatoms, red algae, brown algae, gold algae, yellow-green algae, cyanobacteria and combinations thereof.

In a preferred embodiment of the present disclosure, the algae is green algae including but not limiting to *Picochlorum, Nannochloropsis, Nannochloris, Chlorella, Cyclotella, Navicula* and combinations thereof.

In a preferred embodiment of the present disclosure, the algae is cyanobacteria including but not limiting to *Cyanobacterium aponinum, Synechococcus elongatus* and a combination thereof.

In an embodiment, the algae cultured under nutrient replete followed by nutrient deplete condition is harvested, concentrated and transferred to the thin layer cultivation system.

The harvesting and concentration of the algal culture is performed by physical or chemical methods such as but not limiting to flocculation filtration or a combination thereof.

In an embodiment, the harvested and concentrated culture is transferred to the thin layer cultivation system, wherein the culture is continued to be maintained in nutrient deplete conditions.

In an embodiment of the present disclosure, the algae maintained in the thin layer culture system is exposed to IR radiation while being maintained in the thin layer culture system. IR radiation is known to have long wavelength of 780 nm to 1 mm with heat energy in electromagnetic spectrum. During the exposure of the algal culture to IR radiation, IR rays penetrate the cells and vibrates at molecular level and also induces oxidative stress which eventually leads to lipid induction, to enable efficient lipid production. Maintenance of the algal culture in the thin layer cultivation system further enhances the penetration of the IR radiation to reach all cells of the culture.

In embodiments of the present disclosure, the algae is exposed to IR radiation after about 1 minute to 48 hours of maintenance in the thin layer cultivation system.

In an exemplary embodiment, the algae is exposed to IR radiation after about 24 hours to 28 hours of maintenance in the thin layer cultivation system.

The algae maintained in the thin layer culture system is exposed to IR radiation of wavelength ranging from about 700 nm to 1200 nm for increasing lipid production in algae.

In a preferred embodiment, the algal culture maintained in the thin layer culture system is exposed to IR radiation of wavelength ranging from about 1000 nm to 1100 nm.

In a more preferred embodiment, the IR radiation is of wavelength of about 1100 nm.

In an embodiment, the algal culture maintained in the thin layer culture system is exposed to the IR radiation for a time-period ranging from about 1 second to 60 minutes. In a preferred embodiment, the exposure to IR radiation is for a time-period ranging from about 5 minutes to 30 minutes, preferably from about 5 minutes to about 15 minutes.

The algae maintained in the thin layer culture system is exposed to IR radiation by employing an IR radiation source to generate the IR radiation. The IR radiation source is selected from a group comprising natural and artificial light sources or a combination thereof.

In an embodiment, the IR radiation source is integrated within the thin layer cultivation system or is a separate unit. Said IR radiation source is positioned such that the distance between the IR radiation source and the algae maintained in the thin layer cultivation system ranges from about 1 cm to 100 cm, preferably about 10 cm to 30 cm. In a preferred embodiment, the IR radiation is applied to the algae maintained in the thin layer cultivation system from the top of the culture.

In embodiments of the present disclosure, the thin layer cultivation system is an open or closed system. In an exemplary embodiment, the thin layer cultivation system is selected from a group comprising culture pond, horizontal reactor, vertical reactor, tubular reactor, flat panel reactor, and combinations thereof. Said variants of the cultivation system is depicted in FIGS. 1-7.

In an embodiment, the algae maintained in thin layer cultivation system is further exposed to carbon dioxide ($CO_2$) and sunlight, prior to exposure to the IR radiation. The $CO_2$ and sunlight facilitate photosynthesis in the algal cells maintained in the thin layer cultivation system. In embodiments of the present disclosure, the concentration of $CO_2$ that the algae is exposed to ranges from about 0.03% to 100% and the intensity of the sunlight ranges from about 1800 µmol/m²/s to 2000 µmol/m²/s.

In a preferred embodiment, the $CO_2$ is bubbled through the algal cultured maintained in the thin layer cultivation system to maintain pH ranging from about 6.0 to 7.2.

In order to facilitate the equal distribution of the $CO_2$ and the sunlight between the algal cells maintained in the thin layer cultivation system, the algae are subjected to non-shear mixing, preferably by employing a non-shear pump. The non-shear pump facilitates gentle mixing of the algal slurry in the pond and exposure to natural sunlight without forming dead zones. Said non-shear mixing employed in combination with thin layer cultivation system that maintains the algae at a culture depth of about 1 cm to 10 cm, allows uniform exposure of all cells in the thin layer cultivation system to the $CO_2$ and sunlight that facilitate photosynthesis to produce lipids In an embodiment, evaporation losses due to exposure to sunlight are compensated by adding fresh seawater to the algal culture maintained in the thin layer cultivation system.

In embodiments of the present disclosure, though the algal culture may be maintained at temperatures ranging from about 10° C. to 45° C., preferably the thin layer cultivation system is maintained at a temperature ranging from about 30° C. to 35° C.

In an embodiment, said temperature is maintained by a heat decoupling mechanism. In an embodiment, the temperature of about 30° C. to 35° C. is maintained by heat decoupling mechanism using a liquid medium. In an exemplary embodiment, the method is maintained at the temperature of about 30° C. to 35° C. by heat decoupling mechanism using cold water circulation.

In embodiments of the present disclosure, the method of the present disclosure for enhancing lipid production in algae comprises steps of:
 a) culturing algae under nutrient replete condition followed by nutrient deplete condition;
 b) harvesting the cultured algae;
 c) concentrating the harvested algae;
 d) maintaining the concentrated algae in a thin layer cultivation system; and
 e) exposing the algae maintained in the thin layer cultivation system to IR radiation, to enhance lipid production in the algae.

In embodiments, the method for enhancing lipid production in algae comprises steps of:
 a) culturing algae under nutrient replete condition followed by nutrient deplete condition comprising Nitrogen and Phosphorus depletion;
 b) harvesting the cultured algae;
 c) concentrating the harvested algae to a cell density ranging from about 5 g/L to 100 g/L;
 d) maintaining the concentrated algae in a thin layer cultivation system at a culture depth of about 1 cm to 10 cm; and
 e) exposing the algae maintained in the thin layer cultivation system to IR radiation of wavelength ranging from about 700 nm to 1200 nm for a time-period ranging from about 5 minutes to 30 minutes,
to enhance lipid production in the algae.

In further embodiments, the method for enhancing lipid production in algae comprises steps of:
a) culturing algae under nutrient replete condition followed by nutrient deplete condition comprising Nitrogen and Phosphorus depletion;
b) harvesting the cultured algae;
c) concentrating the harvested algae to a cell density ranging from about 5 g/L to 100 g/L;
d) maintaining the concentrated algae in a thin layer cultivation system at a culture depth of about 1 cm to 10 cm and simultaneously exposing the algae maintained in the thin layer cultivation system to $CO_2$ at a concentration of about 0.1% to 100% and sunlight of intensity ranging from about 1800 µmol/m$^2$/s to 2000 µmol/m$^2$/s; and
e) exposing the algae maintained in the thin layer cultivation system to IR radiation of wavelength ranging from about 700 nm to 1200 nm for a time-period ranging from about 5 minutes to 30 minutes, to enhance lipid production in the algae.

In further embodiments, the method for enhancing lipid production in algae, further comprises steps of:
a) harvesting the algae maintained in the thin layer cultivation system and exposed to IR-radiation;
b) drying the harvested algae to obtain powdered algae; and
c) extracting the powdered algae with a solvent to obtain the lipid.

In an embodiment, harvesting of algae is carried out by centrifugation, flocculation, coagulation, electrocoagulation, filtration or any combination thereof.

In another embodiment, drying the harvested algae is carried out by oven/sunlight drying, lyophilization/freeze drying, or any combination thereof.

In yet another embodiment, extracting the powdered algae is carried out by solvent extraction with or without sonication. The solvents which can be used include chloroform, methanol, toluene, hexane, isopropanol or any combination thereof.

In embodiments of the present disclosure, the enhancement of neutral lipid yield is at least about 30%, preferably ranging from about 30% to about 110% as compared to the yield of neutral lipid when the algae untreated algae which is not maintained according to the method of the present disclosure.

In embodiments of the present disclosure, the enhancement of total lipid yield is at least about 8%, preferably ranging from about 10% to about 60% as compared to the yield of total lipid when the algae is untreated algae which not maintained according to the method of the present disclosure.

Use of the thin layer cultivation system for lipid bioaccumulation in the method of the present disclosure omits the requirement for additional specialized system for bioaccumulation. Further, use of algal slurry instead of dilute culture helped in reducing space requirement substantially and thus is a step forward in making the method economically viable. The method of the present disclosure therefore enables efficient large scale production of lipids from algae by maintaining high cell density algal cultures in large scale cultivation systems and enhancing lipid production by employing a combination of thin layer cultivation, efficient mixing for equal exposure of $CO_2$ and sunlight throughout the culture and exposure of the culture maintained in the thin layer cultivation system to IR radiation.

Figure 8:
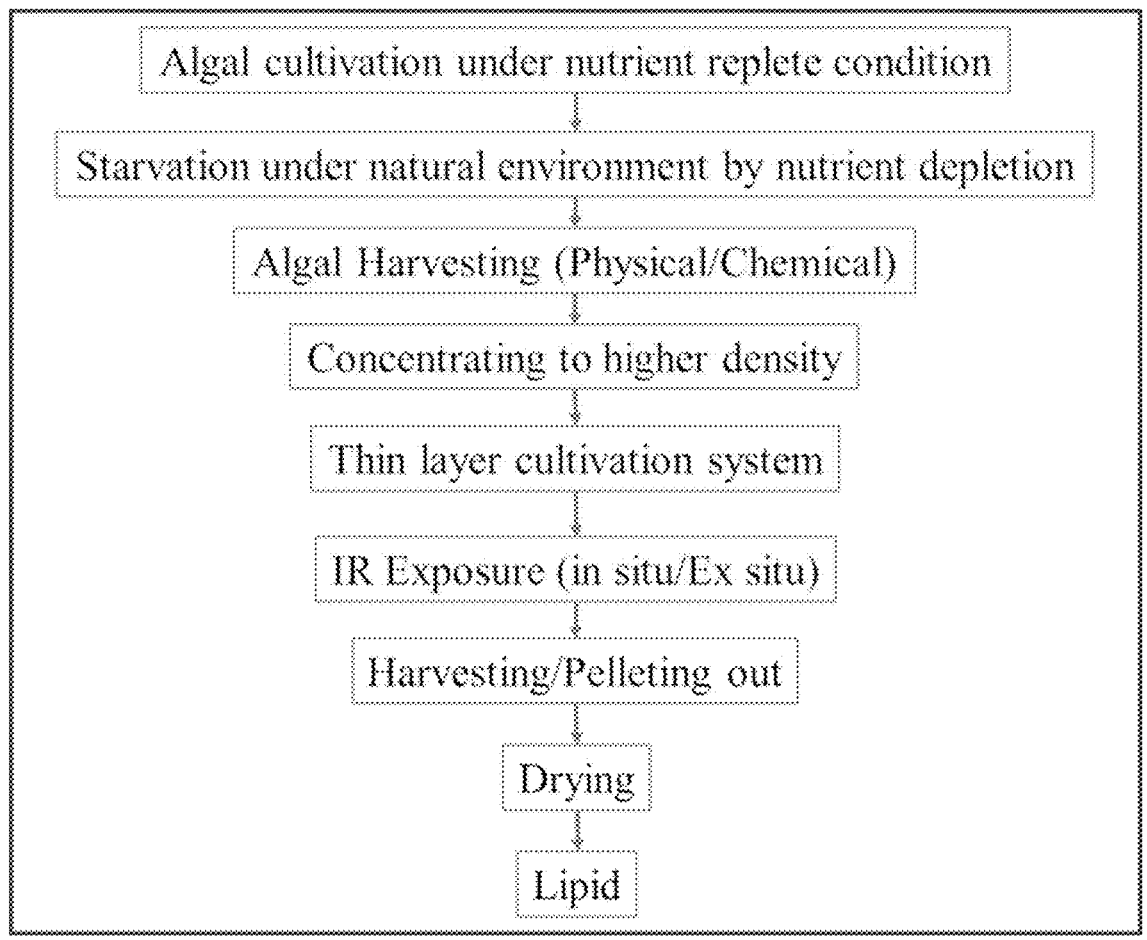
FIG. 8 depicts a flow chart of the steps of the method of the present disclosure.
Figure 9:
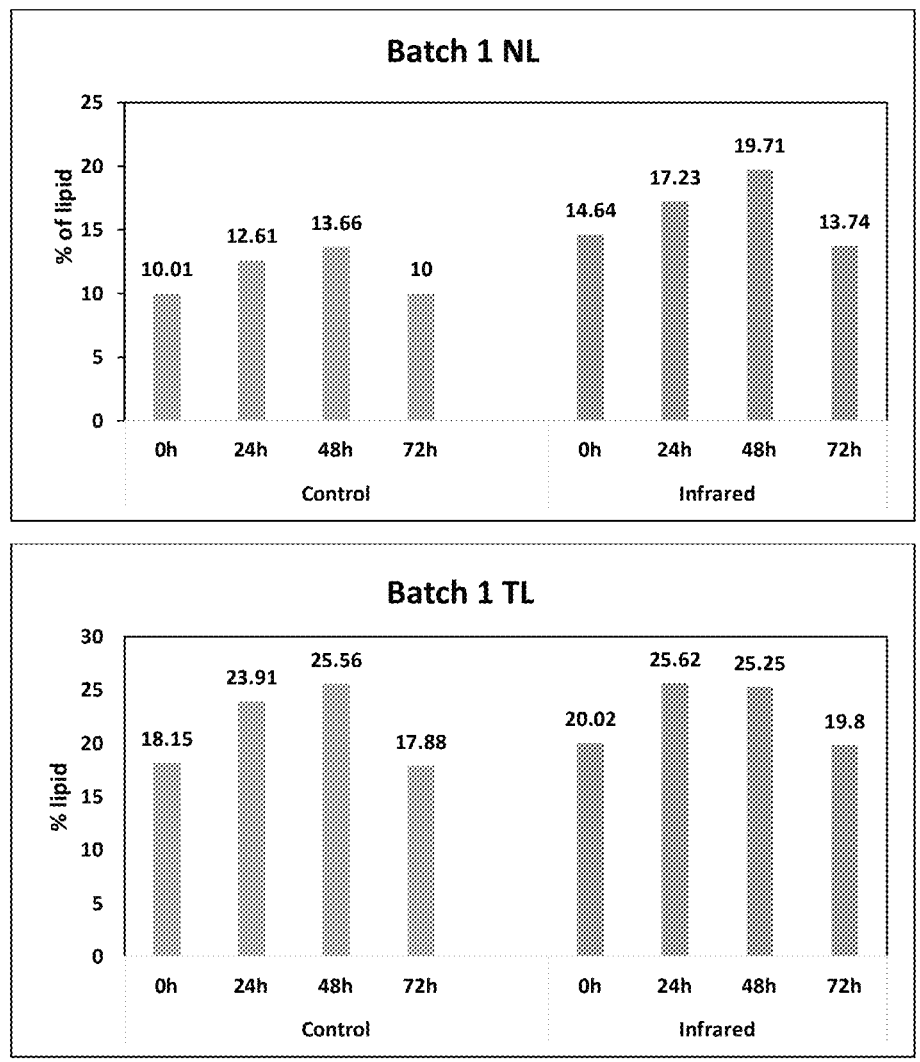
FIG. 9 depicts Neutral and Total lipid data for Batch 1 experiment.
Figure 10:
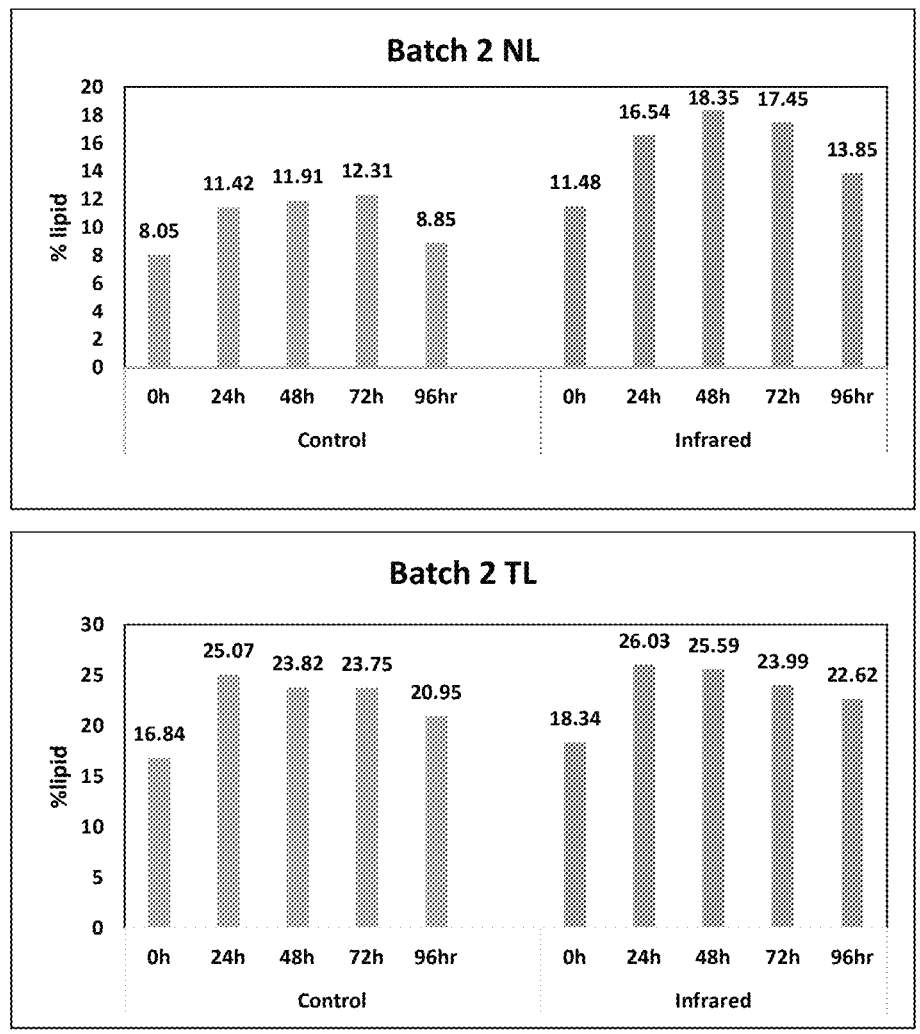
FIG. 10 depicts Neutral lipid and Total lipid data for Batch 2 experiment.
Figure 11:
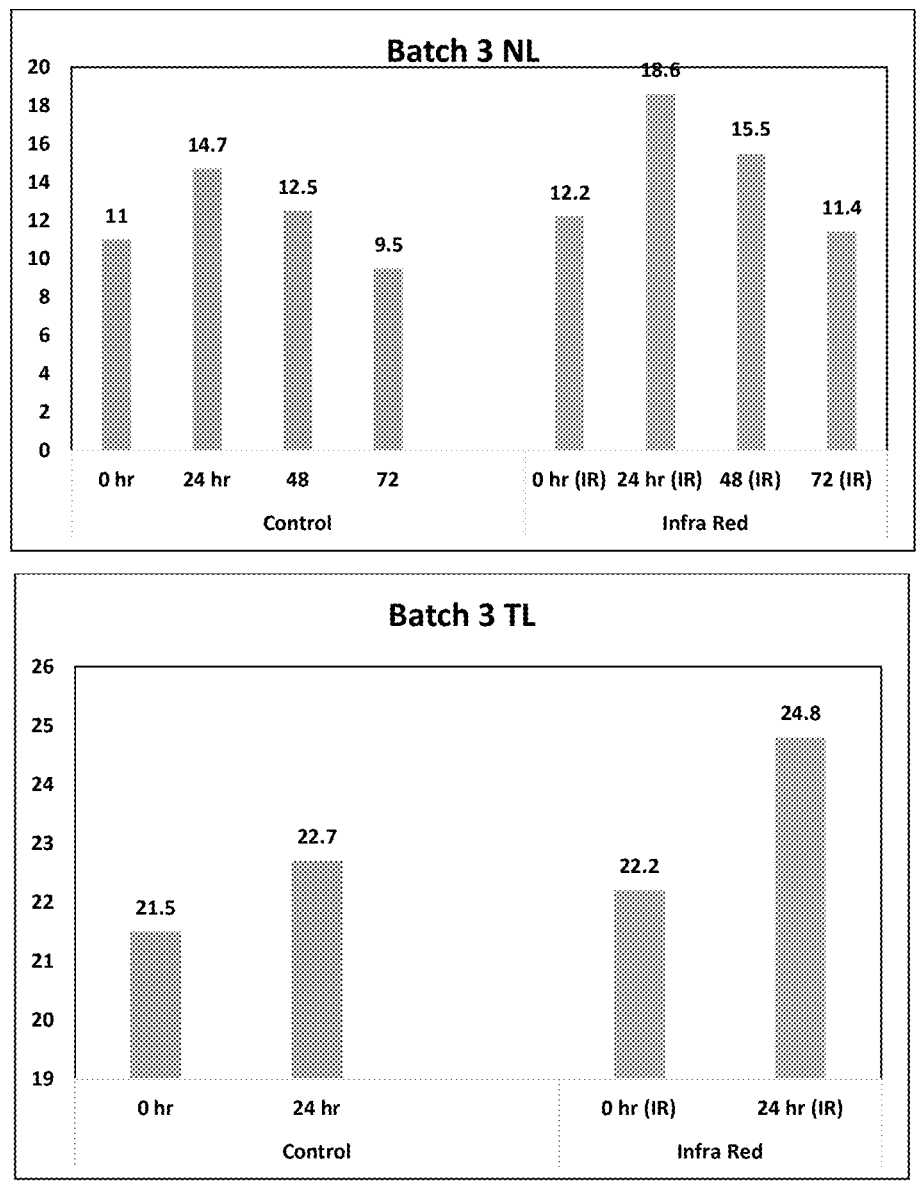
FIG. 11 depicts Neutral and Total lipid data for Batch 3 experiment.
Figure 12:
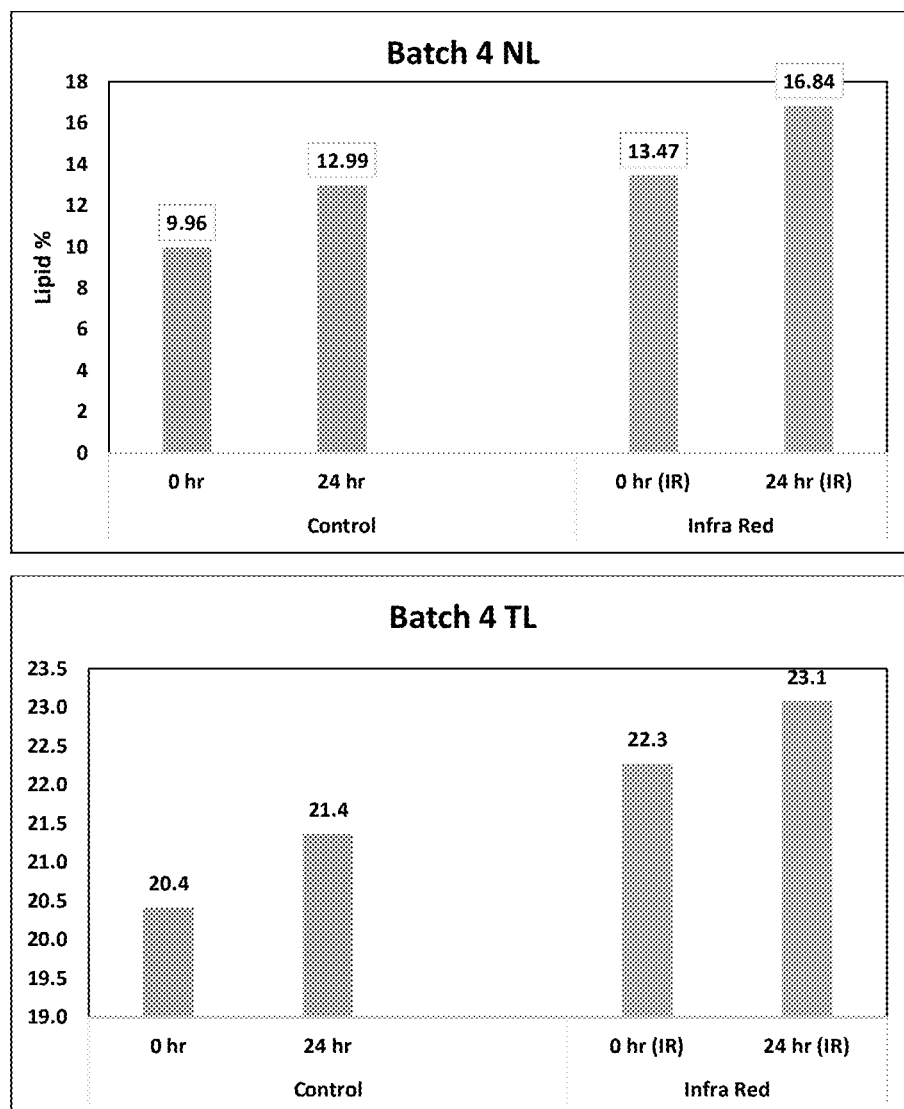
FIG. 12 depicts Neutral and Total lipid data for Batch 4 experiment.
Figure 13:
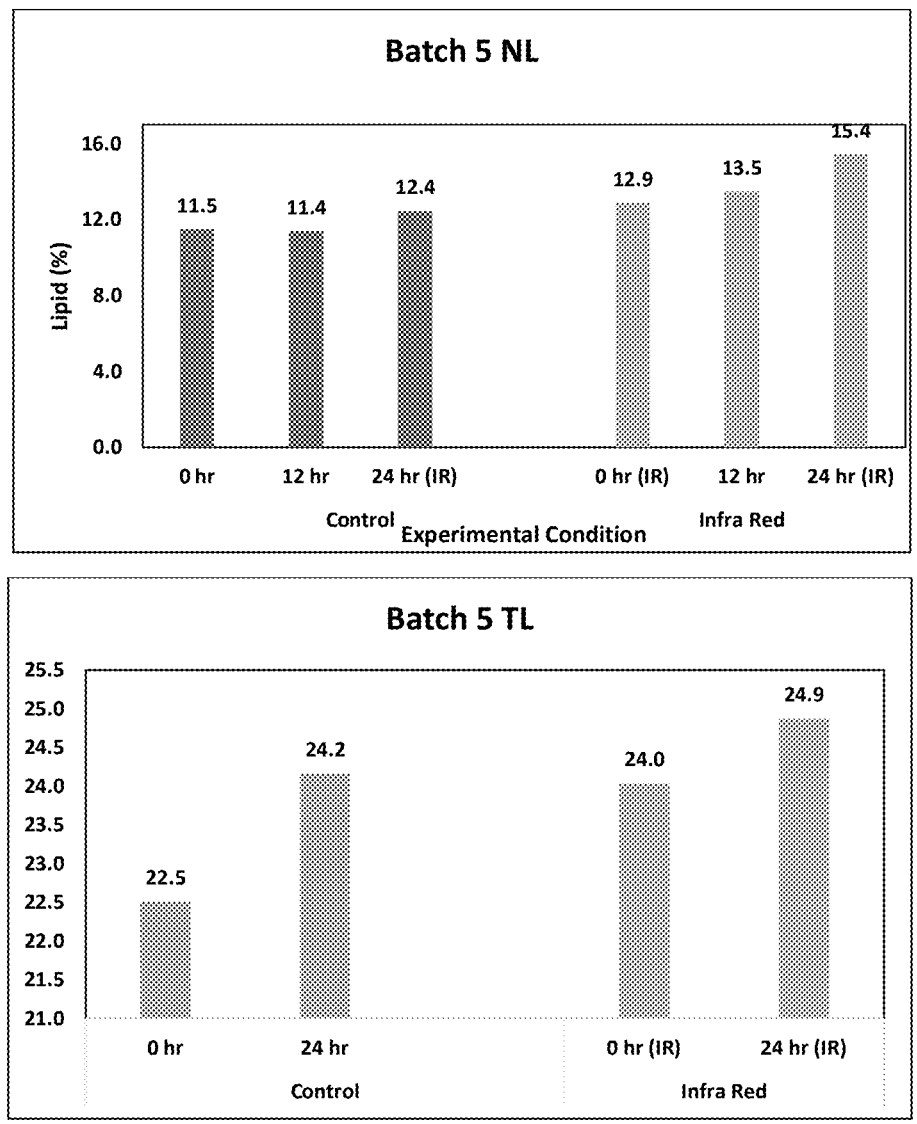
FIG. 13 depicts Neutral and Total lipid data for Batch 5 experiment.

In an embodiment, the steps of the method of the present disclosure are depicted as a flow chart in FIG. 8.

The present disclosure also relates to a system for enhancing lipid production in algae, said system comprising:
a cultivation apparatus,
algae maintained in the cultivation apparatus at a culture depth ranging from about 1 cm to 10 cm, and
a source of IR radiation integrated with the cultivation apparatus,
wherein the lipid production is enhanced in the system by maintaining the algae in the cultivation apparatus and exposing said algae to the IR radiation.

Said system of the present disclosure is an open or a closed system. The system may be employed indoors or outdoors, allowing for large scale production in controlled or environmental conditions.

In an embodiment, the cultivation apparatus is selected from a group comprising culture pond, horizontal reactor, vertical reactor, tubular reactor, flat panel, cylindrical, and combinations thereof.

The algae maintained in the cultivation apparatus is a concentrated algal culture having a cell density ranging from about 5 g/L to 100 g/L. The algae is algae harvested after culturing in alternating conditions of nutrient repletion and nutrient depletion, preferably in a condition of nutrient repletion and followed by nutrient depletion. In a preferred embodiment, the condition of nutrient depletion comprises depletion of Nitrogen and Phosphorus.

In embodiments of the present disclosure, the algae is microalgae selected from a group comprising green algae, diatoms, red algae, brown algae, gold algae, yellow-green algae, cyanobacteria and combinations thereof.

In a preferred embodiment of the present disclosure, the algae is green algae including but not limiting to *Picochlorum, Nannochloropsis, Nannochloris, Chlorella, Cyclotella, Navicula* and combinations thereof.

In a preferred embodiment of the present disclosure, the algae is cyanobacteria including but not limiting to *Cyanobacterium aponinum, Synechococcus elongatus* and a combination thereof.

Said algae employed in the system of the present disclosure is algae that has been cultured in condition of nutrient repletion and followed by nutrient depletion—primarily Nitrogen and Phosphorous depletion. The nutrient depletion leads to starvation of the algal culture. Said condition of starvation is a stress to the algal culture and induces lipid production.

Post culturing the algae in said nutrient replete followed by nutrient deplete conditions, the algal culture is harvested by physical or chemical methods known in the art. The harvested culture is further concentrated to higher cell density by methods known in the art. Examples of such methods for concentration the culture include but are not limited to passage through membrane, centrifugation chemical flocculation or a combination thereof. Said concentrated algal culture is then transferred to the cultivation apparatus in the system of the present disclosure.

In an embodiment, the algal cultured is maintained in the cultivation apparatus in nutrient deplete condition.

In an embodiment, the algae maintained in the cultivation apparatus is exposed to $CO_2$ at concentration ranging from about 0.1% to 100% and sunlight having intensity ranging from about 1800 µmol/m$^2$/s to 2000 µmol/m$^2$/s. In an embodiment, the $CO_2$ is bubbled through the algal culture to maintain ranging from about 6.8 to 7.2.

In an embodiment, the system is integrated with a non-shear pump for non-shear mixing of the algae to provide equal exposure to the sunlight and the $CO_2$, to ensure equal exposure of all algal cells to the sunlight and the $CO_2$. This facilitates efficient photosynthesis and enhances biomass and hence, lipid production.

The system of the present disclosure comprises a source of IR radiation integrated into the system, wherein the source of IR radiation is selected from a group comprising an IR Panel, light filters or any combination thereof. Said source of IR radiation is integrated into the system such that the distance between the IR source and the algae maintained in thin layer cultivation ranges from about 1 cm to 100 cm, preferably about 10 cm to 30 cm.

In an embodiment, the system is operated such that the algae is exposed to the IR radiation after about 1 minute to 48 hours, preferably about 24 hours to 28 hours of maintenance in thin layer cultivation. In a preferred embodiment, the algae is exposed to the IR radiation after about 24 hours of maintenance in thin layer cultivation.

In an embodiment, the algae is exposed to the IR radiation for a time-period ranging from about 5 minutes to 30 minutes, preferably about from 5 minutes to about 15 minutes.

The system of the present further comprises an outlet for harvesting of the algae maintained in the thin layer cultivation and exposed to IR radiation.

The algae harvested from the system is further subjected to drying, powdering and extraction with solvent to obtain the lipid. In embodiments of the present disclosure, the lipid is selected from total lipid and neutral lipid or any combination thereof.

In an embodiment, harvesting of algae is carried out by centrifugation, flocculation, coagulation, electrocoagulation, filtration or any combination thereof.

In another embodiment, drying the harvested algae is carried out by oven/sunlight drying, lyophilization/freeze drying, or any combination thereof.

In yet another embodiment, extracting the powdered algae is carried out by solvent extraction with or without sonication. The solvents which can be used include chloroform, methanol, toluene, hexane, isopropanol or any combination thereof.

The present disclosure further relates to use of the method or the system described above for enhanced production of lipid in algae.

Additional embodiments and features of the present disclosure will be apparent to one of ordinary skill in the art based upon description provided herein. The embodiments herein provide various features and advantageous details thereof in the description. Descriptions of well-known/conventional methods and techniques are omitted so as to not unnecessarily obscure the embodiments herein. Further, the disclosure herein provides for examples illustrating the above described embodiments, and in order to illustrate the embodiments of the present disclosure certain aspects have been employed. The examples used herein for such illustration are intended merely to facilitate an understanding of ways in which the embodiments herein may be practiced and to further enable those of skill in the art to practice the embodiments herein. Accordingly, the following examples should not be construed as limiting the scope of the embodiments herein.

EXAMPLES

The following algae were employed in the present examples—

TABLE 1

Details of Algae employed in the Examples

| S. No. | Location | Identity by PCR and DNA Sequencing |
|---|---|---|
| 1 | Karanja, Maharashtra, | *Picochlorum* sp. |
| 2 | Gagva, Jamnagar, Gujarat | *Nannochloropsis* sp. |

Example 1

Preparing Algal Cultures for Enhanced Neutral and Total Lipid Production

Experiments were performed in biological as well as technical replicates. Multiple batches of two different algal strains *Picochlorum* sp. and *Nannochloropsis* sp. were used for the study.

Initially, the culture was grown in small scale and it was transferred to outdoor ponds to obtain maximum culture density. The algal culture was then maintained without addition of any nutrients in conditions of nutrient depletion. After about 24 hrs, the entire pond culture was harvested and concentrated to increase cell density to about 20 gm/l. This concentrated culture was transferred to the thin layer cultivation system comprising a reaction tank keeping culture depth not more than about 5 cm.

The culture, at this stage also, was continued to be deprived of nutrients, specifically nitrogen and phosphorous.

This culture was bubbled with 100% $CO_2$ to maintain pH between about 6.8 to about 7.2. Light penetration in the culture was measured using light data collector (HOBO data pendent) which was placed in the culture. The culture was mixed using a non-shear pump to facilitate gentle mixing of the algal slurry in the pond and exposure to natural sunlight (about 1800 to about 2000 $\mu mol/m^2/s$ impinging on the culture surface) without forming dead zones. Evaporation losses were compensated by adding fresh seawater. Post about 24 hour maintenance in the reaction tank, the culture was exposed to IR radiation through a custom made infrared light panel for about 5 minutes.

At the end of experiment, algal cells were harvested by pelleting using centrifugation. Once the pellet was collected, it was kept for drying in oven and dried at about 60° C. Finally, the dried pellet was powdered and used for extraction of neutral lipid and total lipid by employing solvent extraction protocol and transesterification process. The total and neutral lipid extractions are performed using the well-known National Renewable Energy Laboratory (NREL) protocol.

The results for Neutral Lipid and Total Lipid analysis performed for 5 different batches are provided in Tables 2 and 3. Said results are depicted in the form of graphs in FIGS. 9-13.

TABLE 2

Comparison of Neutral Lipid content between treated and untreated samples

| Batch no. | Species of algae cultured | % Neutral lipid content in untreated cells at 0 hr (control) | % Neutral lipid content in treated cells at 0 hr | % increase in neutral lipid content (Over the Control) | % Neutral lipid content in untreated cells at 24 hr | % Neutral lipid content in treated cells at 24 hr | % increase in neutral lipid content (Over the Control) |
|---|---|---|---|---|---|---|---|
| 1 | Pichochlorum sp. | 10.01 | 14.64 | 46.2% | 12.61 | 17.23 | 72% |
| 2 | Nannochloropsis sp. | 8.05 | 11.48 | 42.6% | 11.42 | 16.54 | 105.4% |
| 3 | Pichochlorum sp. | 11 | 12.2 | 10.9% | 14.7 | 18.6 | 69.1% |
| 4 | Pichochlorum sp. | 9.96 | 13.47 | 35.2% | 12.99 | 16.84 | 69% |
| 5 | Pichochlorum sp. | 11.5 | 12.9 | 12.1% | 12.4 | 15.4 | 34% |

TABLE 3

Comparison of Total Lipid content between treated and untreated samples

| Batch no. | Species of algae cultured | % Total lipid content in untreated cells at 0 hr (control) | % Total lipid content in treated cells at 0 hr | % increase in neutral lipid content (Over the Control) | % Total lipid content in untreated cells at 24 hr (control) | % Total lipid content in treated cells at 24 hr | % increase in total lipid content (Over the Control) |
|---|---|---|---|---|---|---|---|
| 1 | Pichochlorum sp. | 18.15 | 20.02 | 10.3% | 23.91 | 25.62 | 41.1% |
| 2 | Nannochloropsis sp. | 16.84 | 18.34 | 8.9% | 25.07 | 26.03 | 54.5% |
| 3 | Pichochlorum sp. | 21.5 | 22.2 | 3.2% | 22.7 | 24.8 | 15.3% |
| 4 | Pichochlorum sp. | 20.4 | 22.3 | 9.3% | 21.4 | 23.1 | 13.2% |
| 5 | Pichochlorum sp. | 22.5 | 24 | 6.6% | 24.2 | 24.9 | 10.7% |

The above results show improved Neutral Lipid and Total Lipid production achieved by the method of the present disclosure as compared to untreated cells. The results establish the efficacy of exposing concentrated algal culture maintained in the thin layer cultivation system to IR radiation to enhance neutral and total lipid production.

In addition to the above, no biomass reduction/loss was observed during the experiment.

Example 2

Analysis of the Effect of Combination of Nutrient Starvation and Exposure to IR Radiation Different batches of algae were subjected to three separate sets of experiments a) nutrient starvation of the concentrated culture wherein the culture is maintained in nutrient deplete conditions for about 1 hour b) IR exposure immediately after concentration of culture and c) the experiment of Example 1 (exposure to IR radiation after about 24 hour incubation in nutrient deplete conditions). The results are as follows—

TABLE 4

Analysis of the combined effect of nutrient starvation and IR exposure on neutral lipid content

| Batch no. | Species of algae cultured | Neutral lipid content in untreated cells (control) | Neutral lipid content in nutrient starved algae | % increase in neutral lipid content (Over the Control) | Neutral lipid content in algae exposed to IR radiation immediately after concentration | % increase in neutral lipid content (Over the Control) | Neutral lipid content in algae cultured as per Example 1 | % increase in neutral lipid content (Over the Control) |
|---|---|---|---|---|---|---|---|---|
| 1 | Pichochlorum sp. | 10.01 | 12.61 | 25.9% | 14.64 | 46.3% | 17.23 | 72.12% |
| 2 | Nannochloropsis sp. | 8.05 | 11.42 | 41.8% | 11.48 | 42.6% | 16.54 | 105.4% |

TABLE 4-continued

Analysis of the combined effect of nutrient starvation and IR exposure on neutral lipid content

| Batch no. | Species of algae cultured | Neutral lipid content in untreated cells (control) | Neutral lipid content in nutrient starved algae | % increase in neutral lipid content (Over the Control) | Neutral lipid content in algae exposed to IR radiation immediately after concentration | % increase in neutral lipid content (Over the Control) | Neutral lipid content in algae cultured as per Example 1 | % increase in neutral lipid content (Over the Control) |
|---|---|---|---|---|---|---|---|---|
| 3 | Pichochlorum sp. | 11 | 14.7 | 33.63% | 12.2 | 10.9% | 18.6 | 69% |
| 4 | Pichochlorum sp. | 9.96 | 12.99 | 30.4% | 13.47 | 35.2% | 16.84 | 69% |
| 5 | Pichochlorum sp. | 11.5 | 12.4 | 7.8% | 12.9 | 12.1% | 15.4 | 33.9% |

TABLE 5

Analysis of the combined effect of nutrient starvation and IR exposure on total lipid content

| Batch no. | Species of algae cultured | Total lipid content in untreated cells (control) | Total lipid content in nutrient starved algae | % increase in neutral lipid content (Over the Control) | Total lipid content in algae exposed to IR radiation immediately after concentration | % increase in neutral lipid content (Over the Control) | Total lipid content in algae cultured as per Example 1 | % increase in neutral lipid content (Over the Control) |
|---|---|---|---|---|---|---|---|---|
| 1 | Pichochlorum sp. | 18.15 | 23.91 | 31.7% | 20.02 | 10.3% | 25.62 | 41.1% |
| 2 | Nannochloropsis sp. | 16.84 | 25.07 | 48.9% | 18.34 | 8.9% | 26.03 | 54.6% |
| 3 | Pichochlorum sp. | 21.5 | 22.7 | 5.5% | 22.2 | 3.2% | 24.8 | 15.3% |
| 4 | Pichochlorum sp. | 20.4 | 21.4 | 4.9% | 22.3 | 9.3% | 23.1 | 13.2% |
| 5 | Pichochlorum sp. | 22.5 | 24.2 | 7.56% | 24 | 6.67% | 24.9 | 10.7% |

The above results clearly demonstrate that nutrient starvation or IR exposure when employed independently are not very effective in enhancing neutral lipid and total lipid production in algae. However, when starvation is combined with IR exposure, the increment is highly significant. Thus, the method of the present disclosure has very high potential to make the lipids production at large scale, economically viable.

Example 3

Effect of Duration of Incubation Under Nutrient Deplete Conditions on Enhancement of Lipid Production The effect of duration of incubation of the concentrated culture in nutrient deplete conditions before exposure to IR radiation as per the protocol of the present disclosure, on enhancement of lipid production, was assessed in different batches of algal cultures. The results are as follows—

TABLE 6

Analysis of duration of incubation under nutrient deplete conditions on enhancement of neutral lipid content

| Batch no. | Species of algae | % Lipid content at 0 hr/s24 hr/48 hr/72 hr in untreated cells | % Lipid content after 0 hr incubation in treated cells | % increase in lipid content as compared to untreated cells at 0 hr | % Lipid content after 24 hr incubation in treated cells | % increase in lipid content as compared to untreated cells at 24 hr | % Lipid content after 48 hr incubation in treated cells | % increase in lipid content as compared to untreated cells at 48 hr | % Lipid content after 72 hr incubation in treated cells | % increase in lipid content as compared to untreated cells at 72 hr |
|---|---|---|---|---|---|---|---|---|---|---|
| 1 | Pichochlorum sp. | 10.01/12.61/13.66/10 | 14.64 | 46.2% | 17.23 | 36.6% | 19.71 | 44.3% | 13.74 | 37.4% |
| 2 | Nannochloropsis sp. | 8.05/11.42/ | 11.48 | 42.60% | 16.54 | 44.8% | 18.35 | 54.1% | 17.45 | 41.8% |

TABLE 6-continued

Analysis of duration of incubation under nutrient deplete conditions on enhancement of neutral lipid content

| Batch no. | Species of algae | % Lipid content at 0 hr/s24 hr/ 48 hr/72 hr in untreated cells | % Lipid content after 0 hr incubation in treated cells | % increase in lipid content as compared to untreated cells at 0 hr | % Lipid content after 24 hr incubation in treated cells | % increase in lipid content as compared to untreated cells at 24 hr | % Lipid content after 48 hr incubation in treated cells | % increase in lipid content as compared to untreated cells at 48 hr | % Lipid content after 72 hr incubation in treated cells | % increase in lipid content as compared to untreated cells at 72 hr |
|---|---|---|---|---|---|---|---|---|---|---|
| 3 | Pichochlorum sp. | 11.91/ 12.31/ 11/ 14.7/ 12.5/ 9.5 | 12.2 | 10.9% | 18.6 | 26.5% | 15.5 | 24% | 11.4 | 20% |

TABLE 7

Analysis of duration of incubation under nutrient deplete conditions on enhancement of total lipid content

| Species of algae | % Lipid content Content at 0 hr/24 hr/ 48 hr/72 hr in untreated cells | % Lipid content after 0 hr incubation in treated cells | % increase in lipid content as compared to untreated cells at 0 hr | % Lipid content after 24 hr incubation in treated cells | % increase in lipid content as compared to untreated cells at 24 hr | % Lipid content after 48 hr incubation in treated cells | % increase in lipid content as compared to untreated cells at 48 hr | % Lipid content after 72 hr incubation in treated cells | % increase in lipid content as compared to untreated cells at 72 hr |
|---|---|---|---|---|---|---|---|---|---|
| Pichochlorum sp. | 18.15/ 23.91/ 25.56/ 17.88 | 20.02 | 10.3% | 25.62 | 7.1% | NA | NA | 19.8 | 10.7% |
| Nannochloropsis sp. | 16.84/ 25.07/ 23.82/ 23.75 | 18.34 | 8.9% | 26.03 | 3.8% | 25.59 | 7.4% | 23.99 | 1% |
| Pichochlorum sp. | 21.5/ 22.7/ NA/ NA | 22.2 | 3.3% | 24.8 | 9.3% | NA | NA | NA | NA |

The above data shows that maximum enhancement of neutral lipid and total lipid production was observed when the algae were subjected to about 24 hours to 48 hours of incubation in nutrient deplete conditions.

Advantages

The present disclosure enables enhanced lipid production in algae by a simple, quick and robust method.

The present method allows significant enhancement of neutral lipid and total lipid production in a scalable and cost effective manner, with no reduction in biomass.

The enhanced neutral and total lipid production by the present method is immensely useful in broadening the spectrum of application of algae as feed, food and biofuel.

Additional embodiments and features of the present disclosure will be apparent to one of ordinary skill in art based on the description provided herein. The embodiments herein provide various features and advantageous details thereof in the description. Descriptions of well-known/conventional methods and techniques are omitted so as to not unnecessarily obscure the embodiments herein.

The foregoing description of the specific embodiments fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments in this disclosure have been described in terms of preferred embodiments, those skilled in the art will recognize that the embodiments herein can be practiced with modification within the spirit and scope of the embodiments as described herein.

Throughout this specification, the word "comprise", or variations such as "comprises" or "comprising" wherever used, will be understood to imply the inclusion of a stated element, integer or step, or group of elements, integers or steps, but not the exclusion of any other element, integer or step, or group of elements, integers or steps.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

We claim:

1. A method of enhancing lipid production in algae, said method comprising:
   (a) culturing algae in a condition of nutrient repletion followed by nutrient depletion;
   (b) subsequently maintaining said algae in a thin layer cultivation system at a culture depth of about 1 cm to 10 cm, wherein the algae is subjected to non-shear mixing in the thin layer cultivation system to provide equal exposure to sunlight and $CO_2$, wherein said algae is maintained in nutrient deplete conditions in said thin layer cultivation system, wherein the algae maintained in the thin layer cultivation system is concentrated algal culture having a cell density ranging from about 5 g/L to 100 g/L, and
   (c) exposing said algae maintained in the thin layer cultivation system to infra-red (IR) radiation.

2. The method of claim 1, and wherein the nutrient depletion comprises depletion of one or more of Nitrogen and Phosphorus.

3. The method of claim 1, wherein the algae is microalgae selected from the group consisting of green algae, diatoms, red algae, brown algae, gold algae, yellow-green algae, and cyanobacteria, and combinations thereof; and wherein the lipid is total lipid, neutral lipid or a combination thereof; and wherein the green algae is selected from the group consisting of *Picochlorum, Nannochloropsis, Nannochloris, Chlorella, Cyclotella*, and *Navicula*, and combinations thereof; and the cyanobacteria is one or more of *Cyanobacterium aponinum* and *Synechococcus elongatus*.

4. The method of claim 1, wherein the algae is exposed to IR radiation after about 1 minute to 48 hours; or wherein the algae is exposed to IR radiation of a wavelength ranging from about 700 nm to 1200 nm; or wherein the algae is exposed to IR radiation after about 1 minute to 48 hours, and wherein the algae is exposed to IR radiation of a wavelength ranging from about 700 nm to 1200 nm.

5. The method of claim 1, wherein the algae is exposed to the IR radiation for a time-period ranging from about 1 second to 60 minutes.

6. The method of claim 1, wherein the algae is exposed to the IR radiation for a time-period ranging from about 5 minutes to 30 minutes.

7. The method of claim 1, wherein IR radiation source is employed to generate the IR radiation, and wherein distance between the IR radiation source and the algae ranges from about 1 cm to 100 cm;
   or wherein the thin layer cultivation system is an open or closed system, and wherein said thin layer cultivation system is selected from the group consisting of a culture pond, a horizontal reactor, a vertical reactor, a tubular reactor, a flat panel reactor, and combinations thereof; or wherein IR radiation source is employed to generate the IR radiation, and wherein distance between the IR radiation source and the algae ranges from about 1 cm to 100 cm, and wherein the thin layer cultivation system is an open or closed system, and wherein said thin layer cultivation system is selected from the group consisting of a culture pond, a horizontal reactor, a vertical reactor, a tubular reactor, a flat panel reactor, and combinations thereof.

8. The method of claim 1, wherein the algae maintained in the thin layer cultivation system is exposed to carbon dioxide ($CO_2$) and sunlight; and wherein a concentration of the $CO_2$ ranges from about 0.03% to 100% and an intensity of the sunlight ranges from about 1800 μmol/m²/s to 2000 μmol/m²/s.

9. The method of claim 1, wherein the thin layer cultivation system is maintained at a temperature ranging from about 30° C. to 35° C.

10. The method of claim 1, wherein the method further comprises, after step (a) and prior to step (b):
    (i) harvesting the cultured algae; and (ii) concentrating the harvested algae.

11. The method of claim 1, wherein the step of maintaining the concentrated algae in a thin layer cultivation system further comprises simultaneous exposure of the algae to $CO_2$ at a concentration of about 0.1% to 100% and sunlight of intensity ranging from about 1800 μmol/m²/s to 2000 μmol/m²/s.

12. The method of claim 1, further comprising:
    harvesting the algae maintained in the thin layer cultivation system;
    drying the harvested algae to obtain a powdered algae; and
    extracting the powdered algae with a solvent to obtain a lipid.

13. The method of claim 1, wherein enhancing lipid production in algae comprises enhancing total lipid production, and enhancement of total lipid yield is at least about 8% as compared to the yield of total lipid from untreated algae which is not maintained according to the method of claim 1.

14. The method of claim 1, wherein enhancing lipid production in algae comprises enhancing neutral lipid production, and enhancement of neutral lipid yield is at least about 30% as compared to the yield of neutral lipid from untreated algae which is not maintained according to the method of claim 1.

* * * * *